United States Patent [19]

Lind, Sr. et al.

[11] Patent Number: 4,898,418

[45] Date of Patent: Feb. 6, 1990

[54] TRI LEVEL REFRIGERATED TRAILER

[75] Inventors: Robert C. Lind, Sr., 118 Riverside Dr., San Antonio, Tex. 78210; George Spector, New York, N.Y.

[73] Assignee: Robert C. Lind, Sr., San Antonio, Tex.

[21] Appl. No.: 163,007

[22] Filed: Mar. 2, 1988

[51] Int. Cl.$^4$ ............................ B60P 3/00; B60P 3/08; B60P 3/20

[52] U.S. Cl. .................................. 296/181; 410/24; 410/54; 296/24.1

[58] Field of Search ............ 296/24 B, 25, 181, 182; 410/3, 4, 24, 26, 27, 28.1, 54, 66; 414/537

[56] References Cited

U.S. PATENT DOCUMENTS 2,668,734 2/1954 Bridge ........................... 410/54 X
3,989,268 11/1976 Rawn ................................ 280/432
4,738,575 4/1988 Blodgett et al. .............. 296/181 X

FOREIGN PATENT DOCUMENTS 2090798 7/1982 United Kingdom .............. 296/181

Primary Examiner—Dennis H. Pedder
Attorney, Agent, or Firm—Richard C. Litman

[57] ABSTRACT

A tri-level refrigerated trailer is provided and consists of three support units for supporting three different loads in which the second support unit extends longitudinally outside from the first support unit and includes a refrigerator compartment for receiving the second load while the third support units extends over the first and second support unit to support the third load. The first load can be any type of cargo, the second load can be perishable goods such as food and the third load can be a plurality of motor vehicles or the like.

4 Claims, 2 Drawing Sheets

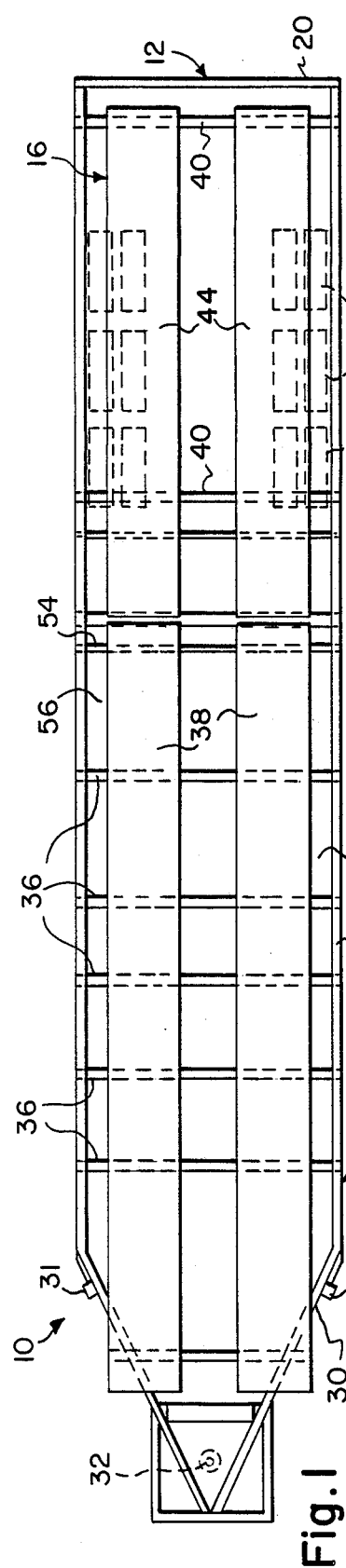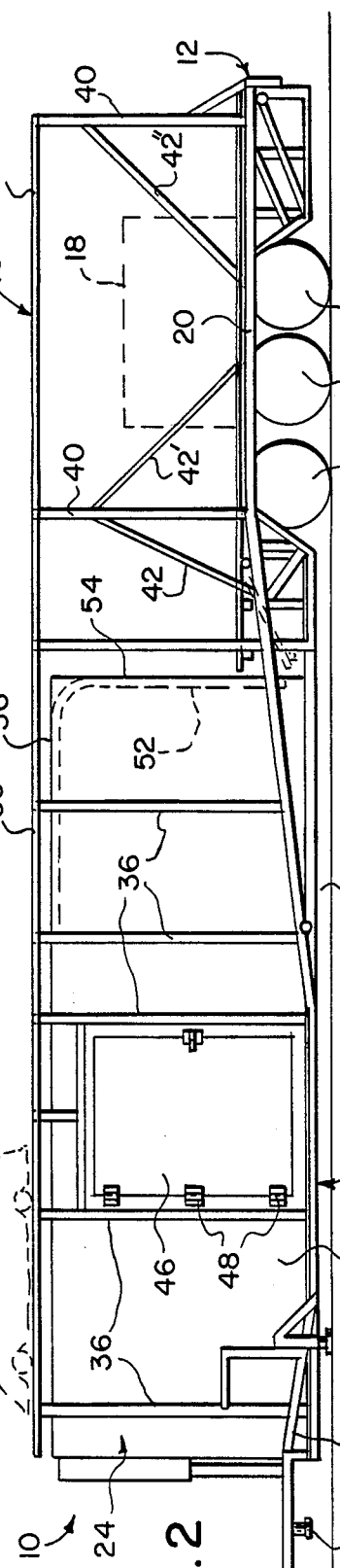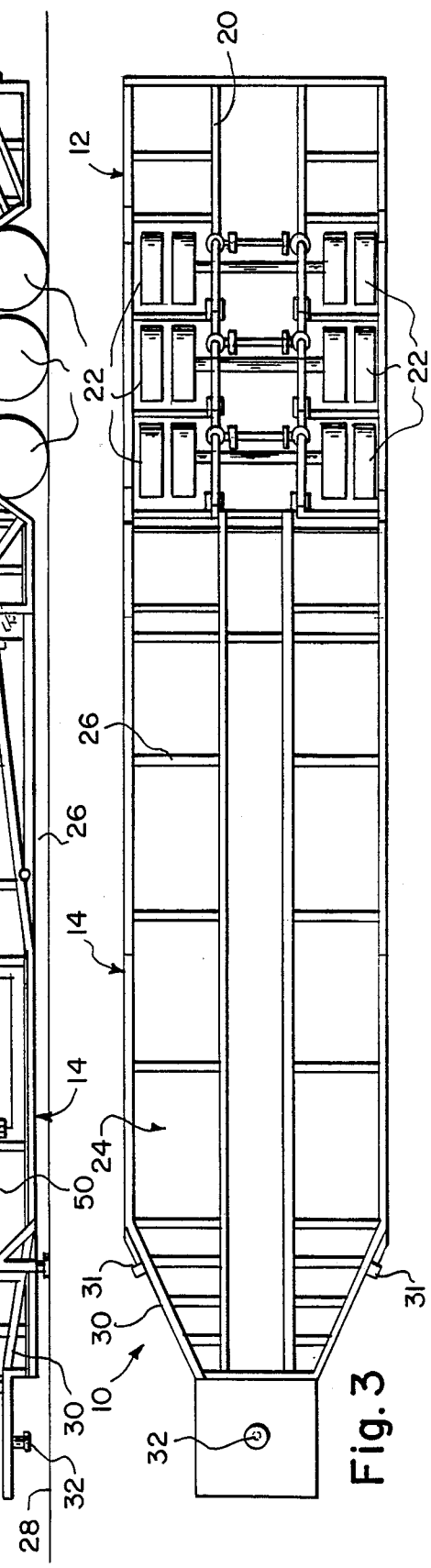

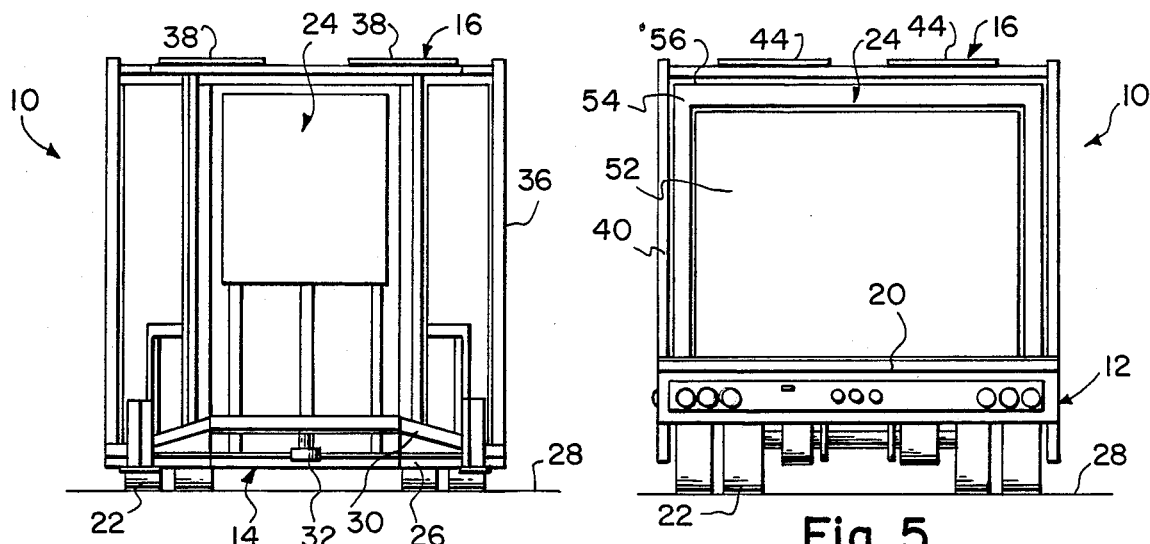
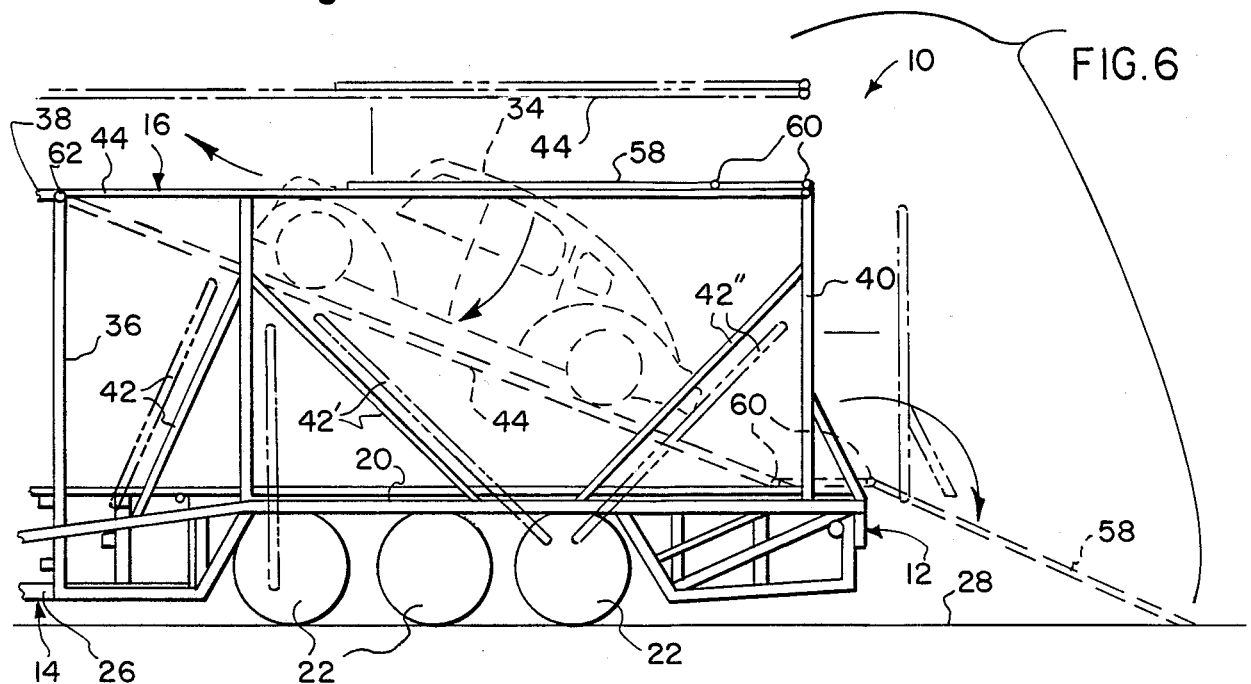
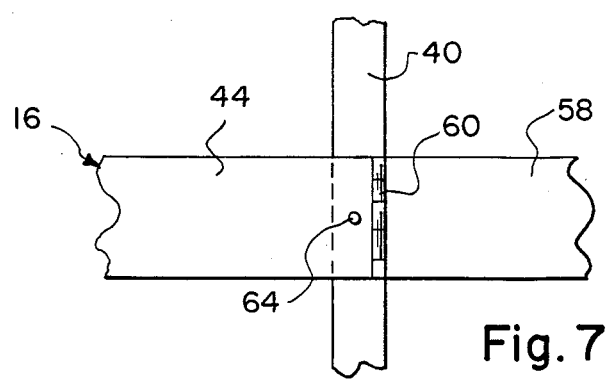

TRI LEVEL REFRIGERATED TRAILER

BACKGROUND OF THE INVENTION

The instant invention relates generally to trailers and more specifically it relates to a tri-level refrigerated trailer.

Numerous trailers have been provided in prior art that are adapted to transport dual loads such as car and boats or the like. For example, U.S. Pat. No. 4,469,346 is illustrative of such prior art. While this unit may be suitable for the particular purpose to which it addresses, it would not be as suitable for the purposes of the present invention as heretofore described.

SUMMARY OF THE INVENTION

A primary object of the present invention is to provide a tri-level refrigerated trailer that will overcome the shortcomings of the prior art devices.

Another object is to provide a tri-level refrigerated trailer that can transport perishable foods, motor vehicles and other types of cargo in three different portions to utilize the trailer efficiently within a predetermined size frame.

An additional object is to provide a tri-level refrigerated trailer that will include extension ramps hinged to the top ramps so that motor vehicles can ride upon the extension ramps to the top ramps so as to be positioned and secured thereon for transportation.

A further object is to provide a tri-level refrigerated trailer that is simple and easy to use.

A still further object is to provide a tri-level refrigerated trailer that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a top view of the invention.
FIG. 2 is a side view thereof.
FIG. 3 is a bottom view thereof.
FIG. 4 is a front view thereof.
FIG. 5 is a back view thereof.
FIG. 6 is a partial side view of a modification in which extension ramps are hinged to the removable ramps so that they can be lowered for motor vehicles to unload upon.
FIG. 7 is a partial top view of one of the removable ramps in FIG. 6 showing a pin or bolt connecting hinged rearward end to a removable box frame post to prevent sliding thereupon.

DETAILED DESCRIPTION OF THE PREFERRED EMBODIMENTS

Turning now descriptively to the drawings, in which similar reference characters denote similar elements throughout the several views, FIGS. 1 through 5 illustrate a tri-level refrigerated trailer 10, that consists of a first support unit 12, a second support unit 14, and a third support unit 16.

The first support 12 is for supporting a first load 18 being any type of cargo and includes a first frame member 20 for receiving the first load 18 and a plurality of ground engaging axle assemblies 22, in which three are shown for best results, for rollably supporting the first frame member 20. There are six axles providing increased braking power on a full truck trailer.

The second support unit 14 extends longitudinally outside the first support unit 12 and includes a refrigerator compartment 24 for receiving a second load (not shown) such as perishable food and the like. A second frame member 26 supports the refrigerator compartment 24. The second frame member 26 extends inside from one of the first frame member 20 near to the ground 28. A nose 30 with low slung stinger fifth wheel 32 extends longitudinally from the other end of the second frame member 26 so as to be carried by a truck (not shown). It is to be noted an anti-skid nose 30 has a trailer rotating restrictor 31 which will engage the truck to restrict rotational movement of the trailer relative to the cab and thus controlling jack-knifing and skidding.

The third support unit 16 extends over the first and second support units 12 and 14 for supporting a third load 34 such as motor vehicles and the like. The third support unit 16 includes a plurality of fixed box frame posts 36 extending upwardly from the second frame member on either side of the refrigerator compartment 24. A pair of parallel fixed ramps 38 are key-pinned onto tops of the box frame posts 36 for receiving some of the third load 34. A plurality of removeable box frame posts 40 extend upwardly from the first frame member 20, while a plurality of removeable support braces 42, 42' and 42" each extend diagonally from each of the removeable box frame posts 40 and the first frame member 20 so as to stabilize the removeable box frame posts 40. A pair of parallel removeable ramps 44 are key-pinned onto the tops of the removeable box frame posts 40 for receiving the rest of the third load 34.

The refrigerator compartment 24 contains a first door 46 hinged at 48 to one side of 50 thereof for receiving the second load therein. A second door 52 is slideably mounted into rear 54 and top 56 thereof for receiving the second load therein from past the first frame member 20.

As shown in FIG. 6, the third support unit 16 further contains a pair of parallel extension ramps 58 hinged at 60 onto rearward ends of the removeable ramps 44. The removeable ramps 44 are pivotly attached at forward ends to the fixed ramps 38 at 62. The removeable ramps 44 can be disengaged from the removeable box frame posts 40 and lowered to the first frame member 20 with the extension ramps 58 positioned at an angle downwardly from back of the first frame member 20, (shown in phantom), so that the third load 34 can be raised by the extension ramps 58 and the removeable ramps 44 onto the fixed ramps 38. Fastener 64, such as pins or bolts connects hinged rearward ends 60 of the removeable ramps 44 to the removeable box frame posts 40 to prevent sliding thereupon. One of the fasteners 64 is shown in FIG. 7.

While certain novel features of this invention has been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A tri-level refrigerated trailer which comprises:
(a) A first support unit for supporting a first load, said first support unit including;
  (i) a first frame member for receiving the first load; and
  (ii) a tri-axle wheel assembly for rollably supporting said first frame member;
(b) a second support unit extending longitudinally from said first support unit, said second support unit including:
  (i) a refrigerator compartment for receiving a second load;
  (ii) a second frame member for supporting said refrigerator compartment, said second frame member extending forwardly of said first frame member;
  (iii) a nose with a low slung stinger fifth wheel extending forward of said second frame member having means to restrict rotation of said trailer relative to said truck for anti-skidding anti-jack-knifing purposes;
(c) a third support unit extending over said first and second support units for supporting a third load, said third load support unit including:
  (i) a plurality of fixed box frame posts extending upwardly from said second frame member on either side of said refrigerator compartment;
  (ii) a pair of parallel ramps fixed onto the tops of said box frame posts for receiving the weight of the third load;
  (iii) a plurality of removable box frame posts extending upwardly from said first frame member;
  (iv) a plurality of removable support braces, each extending generally diagonally from each of said removable box frame posts to said first frame member so as to stabilize said removable box frame posts; and
  (v) a pair of removable adjustable parallel ramps key-pinned on two of said removable box frame posts for supporting the third load when said third load is being moved on or off the trailer.

2. A tri-level refrigerated trailer as recited in claim 1, wherein said refrigerator compartment comprises:
(a) a first door hinged to one side thereof for receiving the second load therein; and
(b) a second door slidably mounted on the rear and top thereof providing access to the second load therein.

3. A tri-level refrigerated trailer as recited in claim 2, wherein said third support unit further comprises a pair of parallel extension ramps hinged onto rearward ends of said removable ramps, said removable ramps are pivotably attached at forward ends to said fixed ramps whereby said removable ramps can be disengaged from two of said removable box frame posts and lowered to said first frame member with said extension ramps positioned at an angle downwardly and rearwardly from said first frame member so that the third load can be self-powered up said extension ramps and said removable ramps onto said fixed ramps.

4. A tri-level refrigerated trailer as recited in claim 3, wherein the key pins further comprise a pair of fasteners, each of which connects the hinged rearward end of each said removable ramp to said removable box frame posts to provide support for loading and unloading.

* * * * *